United States Patent [19]

Fryer

[11] Patent Number: 4,888,720

[45] Date of Patent: Dec. 19, 1989

[54] TUNNEL MEASURING APPARATUS AND METHOD

[76] Inventor: Glenn E. Fryer, P.O. Box 1673, Breckenridge, Colo. 90424

[21] Appl. No.: 129,726

[22] Filed: Dec. 7, 1987

[51] Int. Cl.[4] ............................................. G01N 29/04
[52] U.S. Cl. ..................... 364/506; 364/550; 364/560; 364/512; 73/786; 73/787
[58] Field of Search ....:............................ 364/505–508, 364/512, 550, 560–563, 420–422; 340/690; 73/786, 787, 799, 801, 804, 805, 594, 602

[56] References Cited

U.S. PATENT DOCUMENTS

| | | | |
|---|---|---|---|
| 449,920 | 4/1991 | Thom | 33/544 |
| 4,049,954 | 10/1977 | Da Costa Vieira et al. | 235/151.32 |
| 4,291,579 | 10/1981 | Figihuber et al. | 73/636 |
| 4,381,544 | 4/1983 | Stamm | 364/420 |
| 4,495,816 | 1/1985 | Schlumberger | 73/602 |
| 4,550,376 | 10/1985 | Maciejczak | 364/512 |
| 4,571,848 | 2/1986 | Krutz et al. | 33/544 |
| 4,571,999 | 2/1986 | Arita et al. | 73/602 |
| 4,578,665 | 3/1986 | Yang | 364/551.01 |
| 4,619,143 | 10/1986 | Franken | 73/602 |

FOREIGN PATENT DOCUMENTS 2125966A 3/1984 United Kingdom .

Primary Examiner—Parshotam S. Lall
Assistant Examiner—Brian M. Mattson
Attorney, Agent, or Firm—Dorr, Carson, Sloan & Peterson

[57] ABSTRACT

Apparatus and method for automatically measuring the interior dimensions of tunnels. The apparatus is mounted on an inspection vehicle and comprises a plurality of ultrasonic transducers which are arranged to form an imaginary template a predetermined distance from the tunnel wall. The transducers are periodically operated by a computer to derive measurement information as the inspection vehicle moves through the tunnel. The results of each measurement are stored by the computer for subsequent analysis.

38 Claims, 9 Drawing Sheets

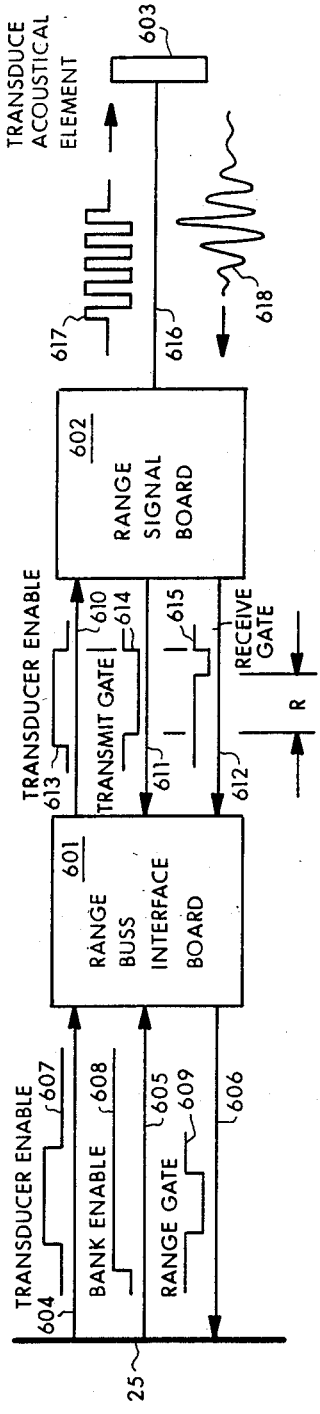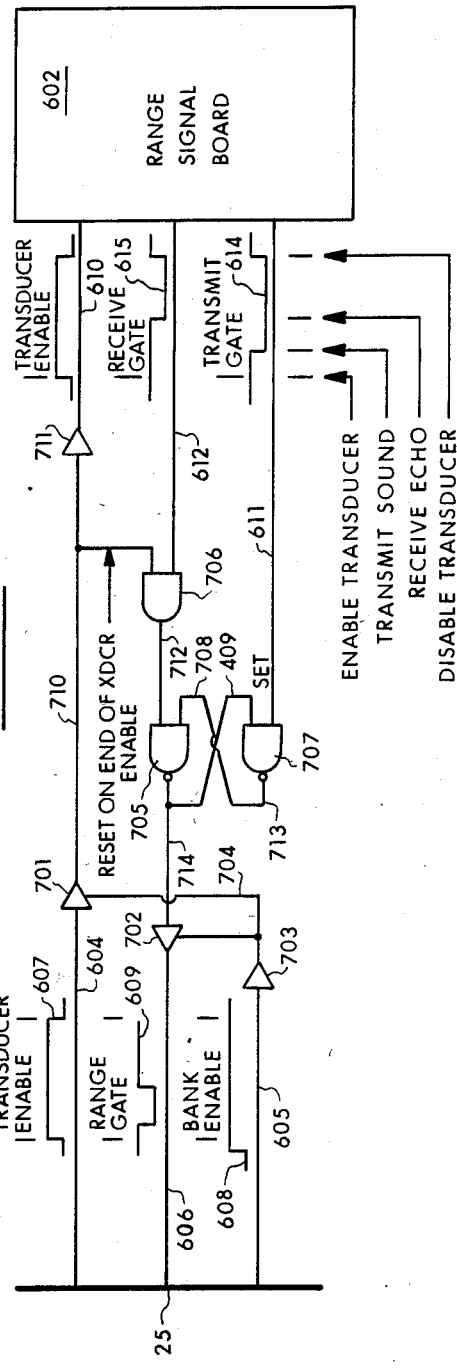

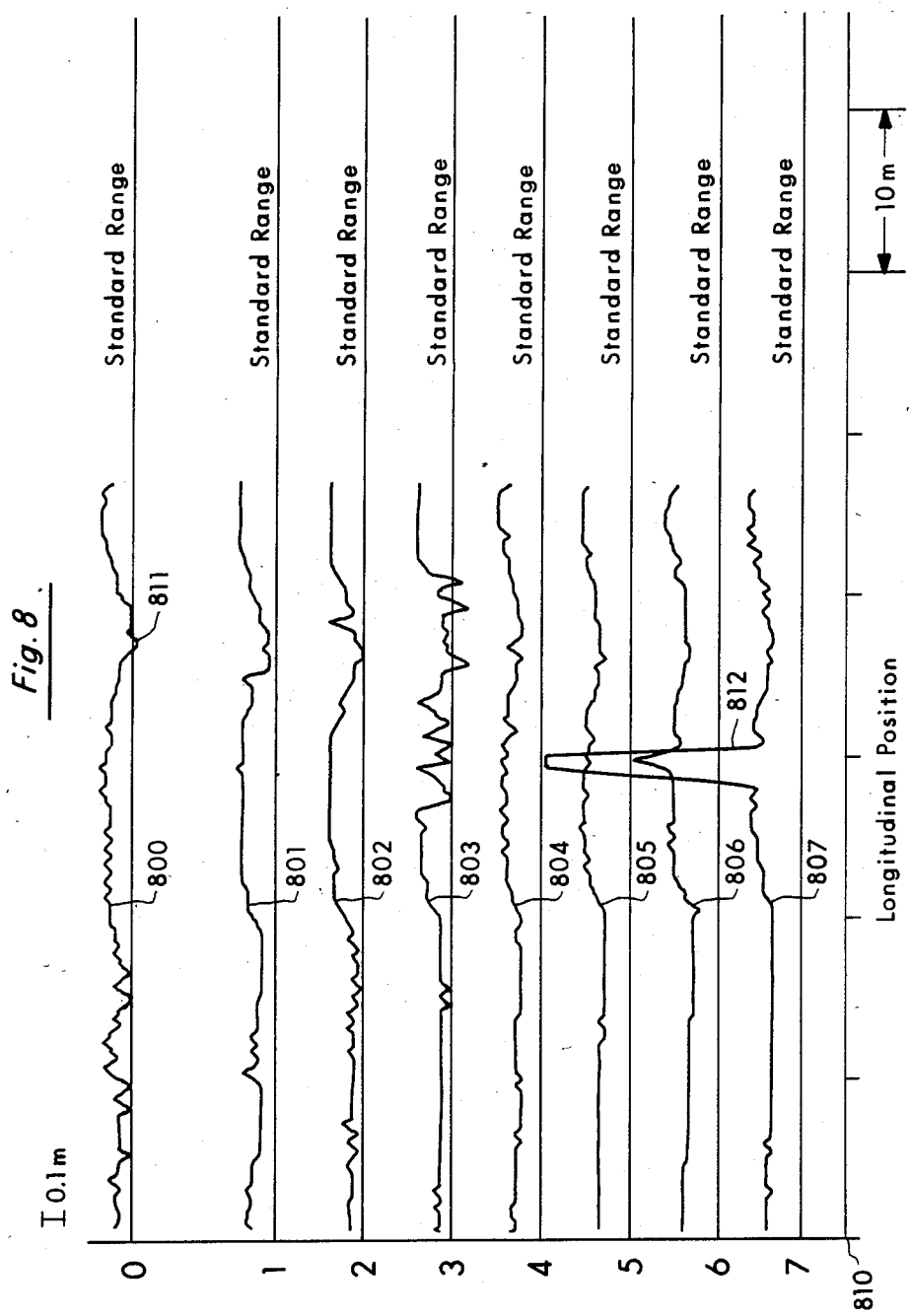

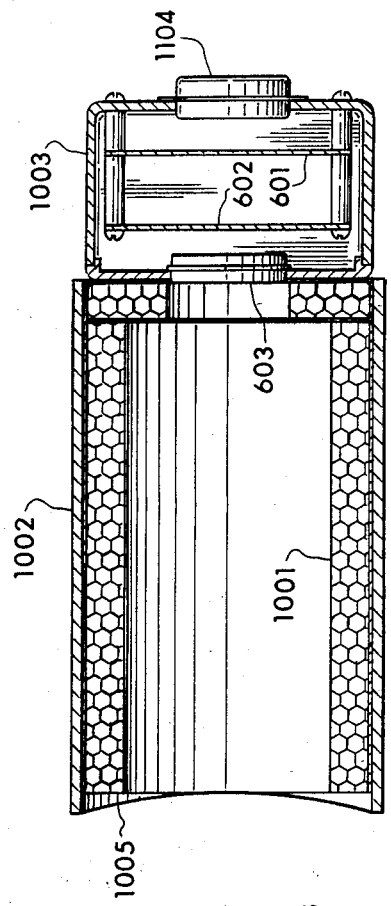
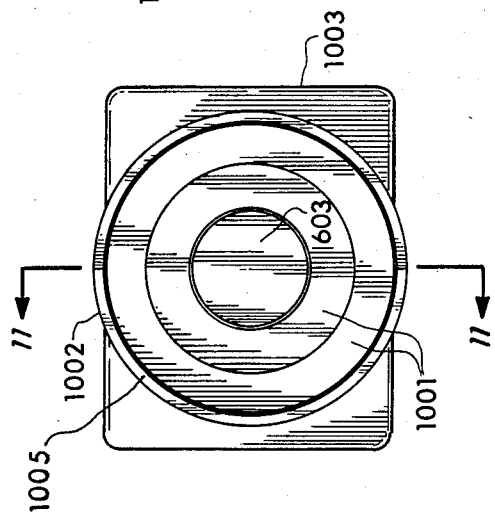
Fig. 11
Fig. 10

TUNNEL MEASURING APPARATUS AND METHOD

FIELD OF THE INVENTION

This invention relates to measuring apparatus and, in particular, to apparatus for measuring the dimensions of tunnels, such as railway tunnels.

BACKGROUND OF THE INVENTION

It is necessary to measure the inner dimensions of a tunnel periodically to ensure that the dimensions have not changed so as to render the tunnel unsuitable for the use for which it was originally constructed. With respect to railway tunnels, it is necessary to measure them periodically to determine that there is sufficient clearance for trains and their loads to pass safely. Tunnels do not remain stable and their dimensions may change over time for a number of reasons. The first is that deteriorating and unstable revetments of the tunnel lining may move inward with time. Another reason is that unstable geological conditions in the formations through which a tunnel was constructed may change the tunnel dimensions. Also, traffic demands may require that larger loads be carried than was originally contemplated. Before a larger load configuration can be assigned to a route, the tunnels involved in the route must be measured to ascertain that adequate clearance exists for the larger load. Also, the increased velocity of modern trains results in greater sway of the cars comprising the train. Tunnels must be measured to ensure they have adequate clearance for high speed trains.

A traditional means of measuring the inner dimensions of a tunnel is to erect a template having the minimum permissible dimensions on a rail inspection car and to make visual observations of the clearance between the tunnel wall and the template as the inspection car travels through the tunnel. This is time consuming and burdensome. Inspection cars also exist with templates having mechanical fingers that can detect contact with the tunnel wall. The fingers are fitted with electrical switches which activate lights on a display panel in the cab when the fingers contact a protrusion on the tunnel wall. This procedure is also time consuming and burdensome since it requires the operator to back up the inspection car and manually examine each detected protrusion.

U.S. Pat. No. 449,920 discloses a rotatable wooden arm used for measuring the inner dimension of a tunnel. The disclosed arrangement is stationary and can measure the inner dimensions of only one tunnel location at a time. U.S. Pat. No. 4,049,954 discloses the use of supersonic waves for measuring the inner dimensions of metallic tubes and the like. U.S. Pat. No. 4,291,579 discloses an inspection device for testing nuclear reactor vessels by means of an apparatus mounted on a track. The disclosed arrangement comprises a testing device mounted on a track utilizing ultrasonic test heads. The test heads are mounted at eight equally spaced points.

U.S. Pat. No. 4,571,848 discloses apparatus for measuring the transverse dimension of a drill hole and its geological formation. This invention is directed to bore holes such as oil and gas bore holes which may undergo diameter changes over time. The invention utilizes a three legged centering device provided with an electrical/hydraulic drive having extending or retracting the legs. United Kingdom Pat. No. 2,125,966 discloses an ultrasonic transducer arrangement which is utilized for the measurement of inner dimensions of pipes and tubes.

It may be seen from the above, that the currently available facilities for measuring and inspecting the inner dimensions of tunnels leaves much be desired since they do not provide for the measurement of tunnel dimensions by use of modern day technology and techniques. Instead, the currently available facilities are slow, time consuming and rely on manual arrangements or visual observation techniques. While the last four above-mentioned patents do provide for the measurement of the inner dimensions of cylindrical objects, such as pipes, they do so in a manner and with the use of facilities that are not applicable to the facile measurement of railway tunnels at the high speeds required by modern day railway systems.

In summary, it may therefore be seen that it is a problem to efficiently generate and collect data pertaining to the inner dimensions of railway tunnels.

SUMMARY OF THE INVENTION

The present invention solves the above discussed problems by providing apparatus that measures the inner dimensions of tunnels. The measurement is made by deriving information specifying the clearance between a plurality of ultrasonic transducers and a portion of the tunnel wall associated with each transducer. The provided apparatus includes an array of ultrasonic range transducers mounted on a railroad inspection car. The transducers are provided in a sufficient number such as for example 32, so that the array of transducers may be configured to define a template having a fixed clearance, such as one meter, from each transducer to the nominal position of the inner walls of the tunnel to be measured. The transducers are controlled by timing and control pulses so that they measure the clearance information at a plurality of tunnel sites. Because of economic considerations, the timing and control pulses can most advantageously be provided by a PC (personal computer). The transducers are operated by the pulses to generate signals that measure the tunnel clearance periodically, such as every 250 millimeters of car travel or every 250 milliseconds. Output signals generated by the transducers are applied to circuitry, including counters, that specifies in numerical units, such as meters, the clearance measured by each transducer. The results of each measurement may be applied from the counters to the computer for storage in its memory. By means of data processing software, comprising no part of the invention, the stored clearance data can be displayed in graphic form in real time under control of the PC or it can be stored in the PC for later analysis and generation of whatever reports may be desired.

The advantage of the present invention over prior methods is that the acquisition of the measurement data is achieved at high speeds and by the use of state of the art apparatus and state of the art apparatus and techniques. The disclosed method generates clearance data that may be recorded by other apparatus comprising no part of the invention, such as a computer and associated printer. Hard copy output of the data from a printer is useful in that it provides a basis of the comparison for future measurements of each tunnel. When revetments or underlying geological formations become unstable, the changes are often slow and irregular and would often go unrecognized by the heretofore available visual inspection procedures. The review of the recorded data over a period of time will reveal any changes in the tunnel dimensions that may have occurred.

It may be seen in view of the above that the apparatus of the present invention provides an improvement in the methods and apparatus heretofore available for measuring the inner dimensions of railway tunnels and the like.

BRIEF DESCRIPTION OF THE DRAWINGS

These and other advantages of the invention may be better appreciated from a reading of the following description thereof taken in conjunction with the drawing in which:

FIGS. 3, 4 and 5 disclose further details of the system circuitry;

FIG. 6 discloses further details of the transducers;

FIG. 7 discloses further details of the range bus interface board;

FIG. 8 portrays one manner in which the generated clearance information may be displayed;

FIGS. 10 and 11 disclose further details of a transducer assembly; and

General Description

Figure 1:
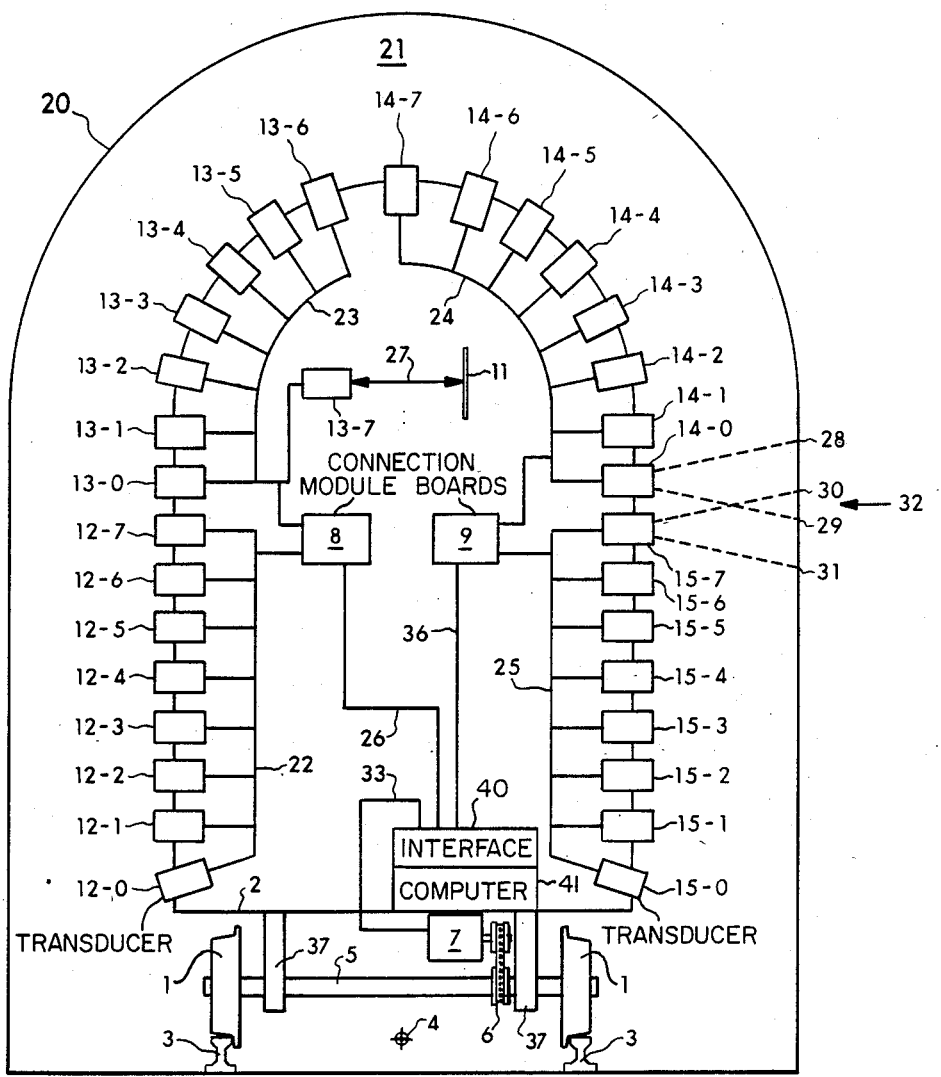
FIG. 1 discloses a system embodying the invention.

The invention is shown on FIG. 1 as comprising measuring apparatus 21 positioned within the confines of a tunnel 20. The apparatus 21 comprises a support frame 2 which rests on members 37 and shaft 5 which support wheels 1. Wheels 1 rest on railway tracks 3. An odometer 7 is connected to shaft 5 by means of the belt drive apparatus 6. Odometer 7 measures the distance the railway car bearing inspection apparatus 21 travels as wheels 1 and shaft 5 rotate.

Mounted atop support frame 2 are ultrasonic transducer groups 12, 13, 14, and 15. Each group comprises eight (0–7) transducers. Transducer 12-0 is tilted downward about 18 degrees. The remaining transducers 12 are horizontally oriented. Each transducer can be operated to emit an ultrasonic pulse whose return echo from the tunnel wall measures the clearance between itself and the left side of the tunnel wall. Transducer 15-0 is also tilted downwards about 18 degrees. The remaining transducers of group 15 are horizontally oriented. Each transducer of group 15 measures the distance between itself and the right side of the wall. The transducers of the groups 13 and 14 are oriented in a semi-circular configuration that matches that of the upper portion of the tunnel wall for a single track tunnel. Each transducer of these two groups measures the clearance between itself and the inner semi-circular portion of the tunnel. The upper right group comprises the eight transducers designated 14-0 through 14-7. The upper left group comprises the transducers designated 13-0 through 13-6 together with the reference range transducer designated 13-7. This transducer is positioned a fixed and known distance 27 from a reference target reflector 11. The distance detected by transducer 13-7 is used as a reference in calibrating the operation of the remaining transducers in groups 12, 13, 14, and 15.

The transducers of group 12 are connected together via bus 22 which, in turn, is connected via connection module board 8 and bus 26 to interface board 40, and computer 41. Similarly, the transducers of group 13 are connected via bus 23, connection module board 8, and bus 26 to interfere board 40 and computer 41. The transducers of group 15 are connected via bus 25, connection module board 9 and bus 36 to board 40 and computer 41. The transducers of group 14 are connected via bus 24, connection module board 9, and bus 36 to board 40 and computer 41.

Computer 41, whose details are known in the art and comprises no part of the invention, applies timing and control signals to interfere board 40 to control the time at which each transducer is fired to emit an ultrasonic measurement pulse towards the tunnel wall. Signals are received from the fired transducers over busses 26 and 36 by interface board 40. These signals enable the interface board to generate data specifying the distance detected by each transducer. Odometer 7 supplies signals over path 33 to interface board 40 and to the computer so that the position of the test car within the tunnel may be determined at all times. The control signals generated by the computer may actuate or fire the transducers periodically, such as every 250 millimeters along the length of the tunnel, so that a snapshot or profile of the tunnel may be later derived from the clearance information detected by the array of transducers once every 250 millimeters. The computer control signals may also fire the transducers periodically at fixed intervals of time such as once every 250 milliseconds. The details of how the computer may perform this function comprise no part of the present invention and is well within the scope of one skilled in the art. The sole function of the computer is to apply timing and control pulses to the circuitry of the present invention.

The operation of the transducers is under control of the computer control signals only with respect to the time and/or sequence in which the transducers are actuated. All other aspects of the transducer operation are controlled by the circuitry of FIGS. 3 and 4. The operation of the transducers is sufficiently fast so that the signal returned by each transducer measures the tunnel clearance with a negligible skew due to the motion of the car. The provision of the thirty one transducers as shown on FIG. 1 provides the required transverse resolution of the measured data. The transducers are positioned so that there is a slight overlap of the detection field of adjacent transducers. The time between successive measurements can be sufficiently short to permit an adequate inspection car velocity.

The longitudinal resolution of the transducers is determined by the number of measurements made per unit distance along the track. An acceptable resolution is one measurement every 250 millimeters or, alternatively, every 250 milliseconds. It is useful if this longitudinal resolution is similar to the transverse resolution. For a given data time interval, the longitudinal resolution can be any value by controlling the car velocity.

The transverse resolution depends on the angle of view (detection cone) of the transducer which, in turn, is a function of the transducer assembly and the transducer element itself. Transducers are spaced so at the nominal minimum range there is a slight overlap in the field of view. This overlap increases with increases in range. Transducer overlaps cause apparent enlargement of small wall protrusions, but it accurately detects the point of maximum protrusion. For example, on FIG. 1 the angle of view of transducer 14-0 is defined by the area between dotted lines 28 and 29. The angle of view of transducer 15-7 is defined by the area between dotted lines 30 and 31. The space between dotted lines 30 and 29, space 32, defines the angle of overlap between transducers 14-0 and 15-7. In the arrangement of FIG. 1, the transverse resolution is 250 millimeters. This is also equal to the longitudinal resolution. This value is a compromise based upon transducer characteristics, computer speed, and a reasonable inspection velocity of the railroad car in which the inspection apparatus 21 is mounted. It is suitable for most purposes given the typical irregularity of the tunnel surface and the character of the anomalies expected.

The computer controls only the timing and the operating sequence of the transducers. The transducer operating sequence is a factor in eliminating transducer cross talk and minimizing data acquisition time. The transducer mounting, as subsequently described, includes acoustical and environmental protection features which are an essential aspect to the operation of the system. The position of each transducer relative to the system center 4 on FIG. 1 and the transducer's angle to the horizontal are constants which are necessary for reconstruction of the tunnel shape from the acquired data. These constants are entered into the computer 41 and stored in a data file. The position of the system along the track is measured by odometer 7 which is driven by the timing belt 6 and the rotation of axle 5. Transducer 13-7 measures the reference range 27. The reference range obtained from transducer 13-7 is used by computer 41 to determine the corrected range for the other transducers. This is required because of the dependence of the velocity of sound on air temperature and pressure and to a lesser extent on the relative humidity within the measured tunnel.

The transducers are spaced so their detection cones overlap slightly at the nominal minimum range. The overlap increases with increased range. This causes distortion in the perceived size of an anomaly. The dimension of an anomaly parallel to the plane of the wall is enlarged for a protrusion and diminished for an intrusion. The dimension of a protrusion normal to the wall is preserved. The dimension of an intrusion normal to the wall is diminished if it is small compared to the detection cone of the transducer. Transducers 12-0 and 15-0 are shown inclined downward 18 degrees to cover the lower part of the tunnel wall.

DESCRIPTION OF FIG. 2

Figure 2:
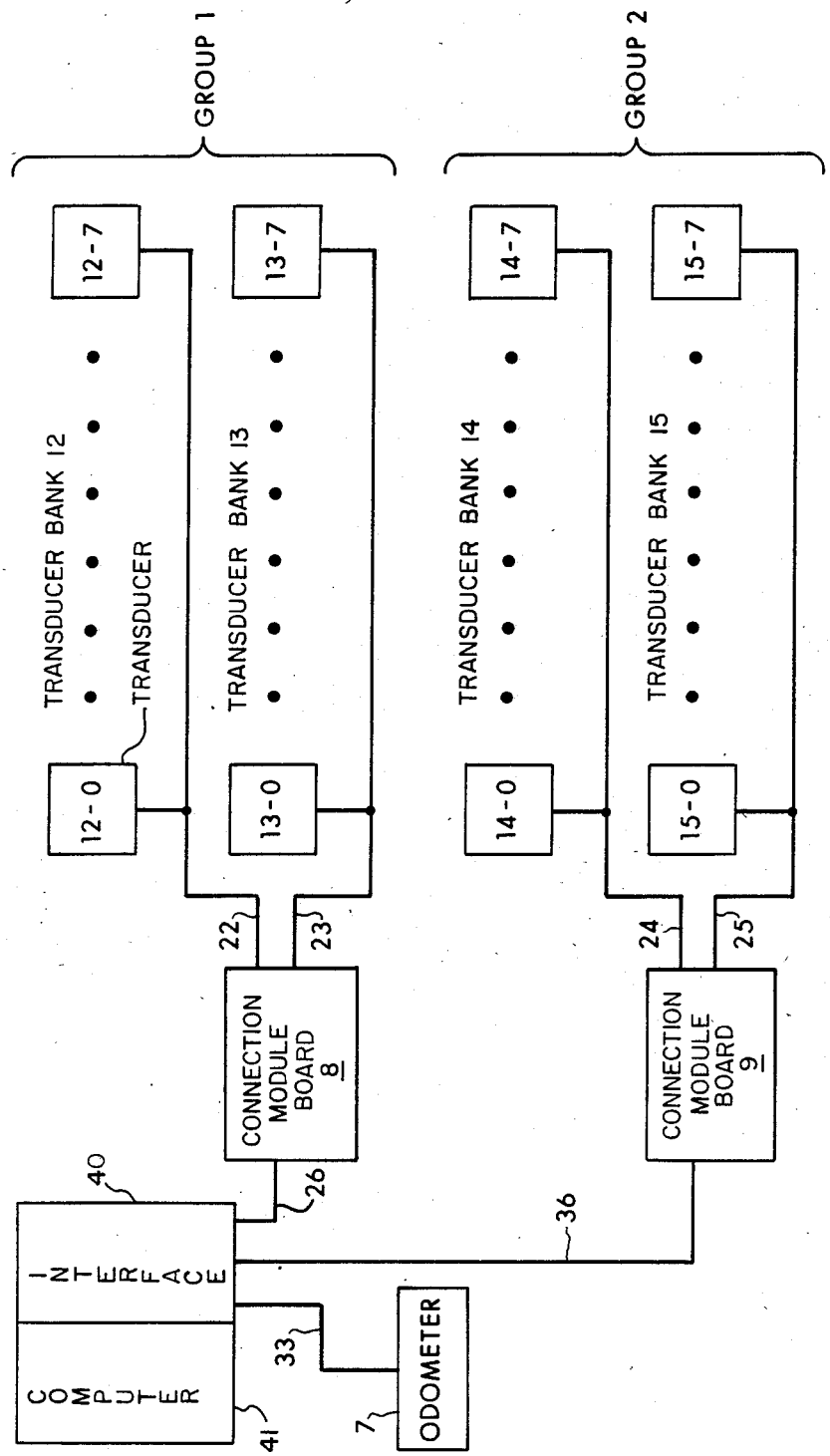
FIG. 2 discloses further details of the invention.

FIG. 2 discloses how the elements of the test system are connected together electrically. Computer 41 is shown in upper left hand corner and is connected to interface board 40 via an expansion slot of the computer in the same manner as other "add on" boards available in the marketplace may be connected to a Personal Computer (PC) via the expansion slot of the PC. The interface board 40 is connected via buses 26 and 36 to connection module boards 8 and 9, respectively, which are connected via buses 22, 23, 24 and 25 to the four banks (12, 13, 14 and 15) of transducers. Computer 40 controls the time at which the transducers operate via connection module boards 8 and 9. Selected transducers in a selected bank are operated when a bank enable signal is applied to all transducers of the selected bank together with transducer enable signals unique to the selected transducers in the selected bank. The activated transducers return signals to the interface board 40 which derives data representing the clearance measured by each activated transducer. Odometer 7 applies information over path 33 to board I regarding the position of the test apparatus within the tunnel.

Figure 3:
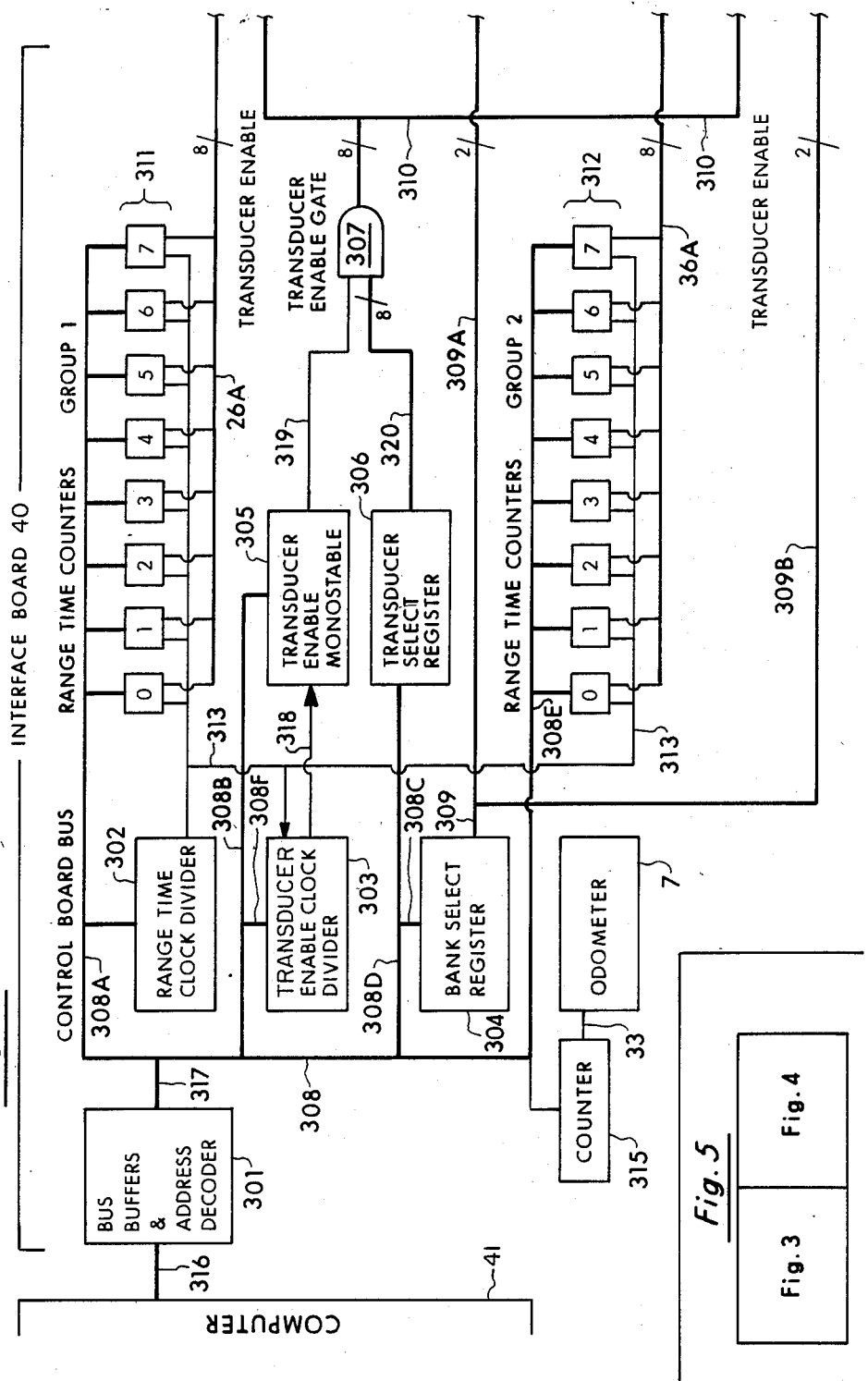
Figure 4:
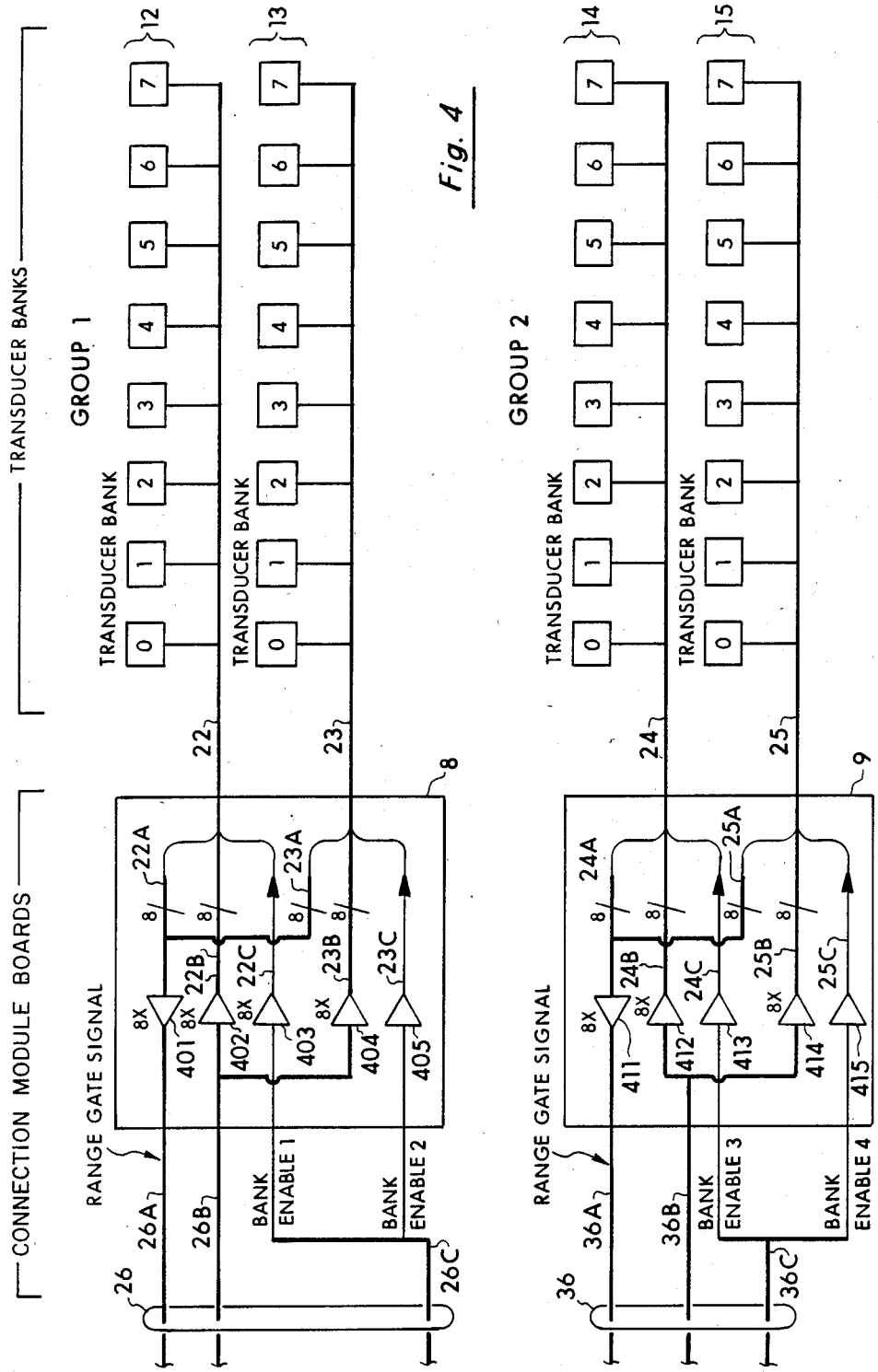

DESCRIPTION OF FIGS. 3, 4 and 5

FIGS. 3 and 4, when arranged as shown in FIG. 5, disclose further details of how the computer communicates with the transducers via interface board 40 and the connection module boards 8 and 9. Computer 41 is shown on the left side of FIG. 3 and is connected by bus 316 with the interface board 40 of FIG. 3. Bus 316 may be the circuitry of the expansion slot of the computer. The interface board 40 of FIG. 3 is connected via buses 26 and 36 with connection module boards 8 and 9 on FIG. 4. The connection module boards 8 and 9, in turn, are connected to the four transducer banks 12, 13, 14 and 15 on FIG. 4. Transducer banks or groups 12 and 13 are connected via buses 22 and 23, respectively, to connection module board 8. Transducer banks 14 and 15, respectively, are connected via buses 24 and 25, respectively, to connection module board 9. There are 8 transducers 0 through 7 in each transducer bank. This makes a total of 32 transducers. Each of buses 22 through 25 is connected to each one of the 8 transducers in its bank by three separate conductors. With reference to bus 22 and transducer bank 12, the three conductors extending to a transducer of bank 12, say transducer 0, are the bank enable conductor 22C, which is common to all transducers of bank 12, a unique one of the 8 conductors in bus 22B, and a unique one of the 8 conductors in bus 22A. As is subsequently described, a selected transducer is operated to derive range information (tunnel clearance information) by concurrently applying a bank enable signal to path 22C and a transducer enable signal to the one conductor of bus 22B that is unique to the transducer to be activated. Thus, for transducer 0 of bank 12, the application of the bank enables signal to path 22C specifies that one of the 8 transducers of this group is to be activated. The concurrent application of a transducer enable signal on the one conductor of bus 22B that is unique to transducer 0 activates transducer 0. Transducer 0 responds to the concurrent reception of the bank enable and the transducer enable signal and emits an ultrasonic measurement pulse towards its associated portion of the tunnel wall. Subsequently, the fired transducer receives a return echo signal and returns a range gate signal representing the measured tunnel clearance over the one conductor of bus 22A that is unique to transducer 0. The range gate signal on bus 22A is extended via element 401 of module board 8 and bus 26A to the interface board of FIG. 3. The interface board contains a first group of 8 counters 311. Each of the 8 counters 311 is unique to one of the transducers in each of the transducer groups 12 and 13. Thus, counter 0 of group 311 is functionally associated with transducer 0 in transducer bank 12 as well as with transducer 0 in transducer bank 13.

Only transducers in one bank or group of a pair of banks or groups can be actuated at a time. In other words, if one or more transducers in bank 12 are fired, transducers in bank 13 cannot be fired at the same time. For the current description, assume that transducer 0 of bank 12 is fired. When a return echo signal is received, counter 0 of group 311 receives the range gate signal from transducer 0 of bank 12 over bus 26A. The pulse width of this received signal represents the measured distance between transducer 0 of group 12 and the tunnel wall. Counter 0 concurrently responds to pulses generated by divider 302 and applied to path 313. These pulses step counter 0 one counting position per pulse so long as the range gate signal applied to the counter by bus 26A remains true. Subsequently, the range gate signal goes false and the counter 0 no longer responds to pulses on path 313. At that time, the position of counter 0 represents the distance measured by the transducer 0 of transducer group 12.

The range time clock divider 302 receives a clock signal from the computer. This signal is received via path 316, buffers and decoders 301, path 317 and path 308A. Divider 302 receives this clock signal from the computer and divides it at a rate which provides range data information from the counters directly in millimeters. This divided clock signal is applied over path 313 to the counters 311. The particular counter that responds is the one that is concurrently receiving a true range gate signal from a fired transducer from bus 26A. The range gate signal subsequently goes false and the count of the activated counter in group 311, such as counter 0, represents the measured distance information of the associated transducer directly in millimeters. The counters 311 are reset by a control pulse from the computer prior to each new operation of the transducers of a group.

The output of divider 302 on path 313 is also applied to the input of the transducer enable clock divider 303. Circuit 303 divides the signal received on path 313 and applies an output signal over path 318 to the input of the transducer enable monostable element 305. The signal on path 318 serves as a clock pulse for transducer enable monostable 305. Circuit 305 is triggered by a control signal from computer 41 over path 308b when a transducer is to be fired. The duration of time the monostable 305 remains in an on state when it is triggered is controlled by the clock pulses on path 318. The output of the activated monostable 305 is applied over path 319 to the upper input of enable gate 307 which represents 8 gates. The signal on path 319 occurs at the rate at which the transducers are to be fired, such as once every 250 milliseconds. Transducer select register 306 receives input information representing the transducers to be fired from the computer via the decoder 301 and bus 308D which is a part of bus 308. Transducer select register 306 is an 8 bit latch which receives and stores a data word specifying the one or more transducers that are to be fired in a bank. Each true bit in the data word stored in register 306 causes a different one of the 8 transducers in the enable bank or group to be fired. All bit combinations are valid insofar as hardware operations of register 306 are considered. However, all such bit combinations are not valid from the point of transducer interference. Transducers which may receive each other echoes are not fired simultaneously. Thus, if only transducer 0 of bank 12 is to be fired, then only bit position 0 in register 306 is true. When transducer 0 is to be fired, the output of register 306 is applied over path 320 to enable one of the 8 gates 307, which concurrently receives the output of the monostable 305. With the upper and lower inputs of a gate 307 concurrently activated, the one output conductor of this gate 307 is activated that is uniquely associated with transducer 0 of bank 12. This signal is applied as a transducer enable signal over path 310, bus 26B, buffer 402, bus 22B to the transducer enable input of transducer 0. The reception of this signal together with the concurrent reception of the bank enable signal on path 22C causes transducer 0 of bank 12 to fire.

Transducer 0 emits an acoustical pulse and subsequently receives a return signal with a time delay that represents the distance between the transducer and the wall of the tunnel. This return signal is processed by transducer 0 which returns a range gate signal over bus 22A, buffer gate 401, and bus 26A. This signal is applied to counter 0 of counter group 511 which counts the number of pulses received from divider 302 while the received range gate signal remains true. The duration of the range gate signal is proportional to the measured tunnel clearance and the setting of counter 0 when the range gate signal goes false represents the measured distance between transducer 0 and the tunnel wall in millimeters.

Bank select register 304 is a 4 bit latch which receives over path 308C from computer 41 a data word whose true bits represent the transducer banks that are to be active. Not all bit combinations are valid. Only one bank of a transducer group may be fired at a time. In other words, transducers in both banks 12 and 13 cannot be fired concurrently. Either bank 12 or bank 13 must be selected to the exclusion of the other bank. Similarly, only one of the banks of bank 14 or 15 must be selected to the exclusion of the other. However, transducers in a bank of group 1 and a bank of group 2 may be selected for concurrent firing.

Counter group 312 serves the transducer groups 14 and 15 similarly to the way counters 311 serves transducer groups 12 and 13. Range gate signals are applied to the inputs of the range time counters 311 and/or 312 depending upon which banks are enabled. The range gate signals are applied to paths 26A and 36A and they enable the counters 311 and 312 so that they respond to the pulses generated by divider 302 for a time duration that is defined by the tunnel clearance measured by each transducer. In other words, the range gate signal generated by each fired transducer has a duration which is proportional to the distance between the transducer and the tunnel wall. Each return range gate signal on busses 26A and 36A is applied to its associated counter in either group 311 or 312. The associated counter receives pulses from divider 302 on path 313 and counts these pulses for the duration of time that the received return range gate signal applied to the counter is true. At the conclusion of the true state of each returned range gate signal, the associated counter contains a number equal to the detected range of its transducer in millimeters.

The counts generated by the counters 311 and 312 are read by the computer over buses 308A and 308E via buffers 301. These numbers may, if desired, be corrected by the computer for the effects of air, temperature, pressure, relative humidity and clock frequency by a comparison with the data returned by the reference transducer 13-7. This transducer is a fixed distance 27 (FIG. 1) from its target reflector 11 and the information it returns represents a fixed and known range. The corrected data generated by the computer can be stored and used subsequently with software comprising no part of the present invention, to display a simplified graphic representation of the tunnel cross section on the display screen of the computer.

Computer 41 controls the sequence in which the transducers are to be fired. Only one bank of a transducer group can be fired at a time. Within a transducer bank, however, the transducers may be fired in any manner chosen by the computer. Thus, all of the transducers of a bank may be fired concurrently or one at a time sequentially, or in any order. Alternatively, the even or the odd numbered transducers may be fired concurrently within a bank. All transducers of the bank can be fired concurrently if problems are not caused by possible transducer interference. Transducers from a selected bank in group 1 and a selected bank in group 2 may be fired concurrently if desired. Thus, one or more transducers of bank 12 can be fired concurrently with one or more transducers of bank 14. The following summarizes the above described interaction of the circuitry of FIGS. 3 and 4 with computer 41. Computer 41 is shown only diagrammatically since its details are known in the art and comprise no part of the present invention. Also, not specifically disclosed are the details of how the PC 41 generates the various timing and control signals that are applied to the circuitry of FIG. 3. The specification describes in detail the nature of each control signal required by the circuitry of FIG. 3 for its operation. Based upon this detailed information in the specification, it is well within the capabilities of one skilled in the art to cause a PC to generate the control signals described in the specification. These various timing and control signals comprise (1) a clock signal, (2) a reset signal for counters 311 and 312, (3) a trigger signal for monostable 305, (4) a data word for bank select register 304 to generate a bank enable signal, and (5) a data word for transducer select register 306 to select the transducer to be fired.

The clock signal, which may be the PC clock, is applied by the PC to bus 316. This signal times the various circuits on FIG. 3. The counter reset signal is applied to bus 308A and 308E to initialize counters 311 and 312 prior to the operation of the transducers. The specifics of the reset signal will depend upon the type of reset signal required by the counters. Next, a data word in sent by the PC over bus 308D to bank select register 304. The true bits of this word specify which one or more of the four transducer banks is to be enabled with a bank enable signal on the associated one of paths 22–25. At the same time a data word is sent by the PC over bus 308D to transducer select register 307. The true bit or bits of this word specify the transducer that is to be fired in each enabled bank. The specified transducers are fired when the PC sends a signal over bus 308B to trigger transducer enable monostable 305.

The fired transducers apply output signals to the associated ones of counters 311 and 312 which advance to a setting indicative of the distance measured by each fired transducer. The output of the counters 311 and 312 appears on busses 308A and 308E to make the clearance data represented by the counter available to the PC for whatever purposes the PC user may desire. Finally, another reset signal is applied to counters 311 and 312 to prepare for the next operation of the transducers.

It can be seen from the above that the PC applies signals to the circuitry of FIG. 3 of the type and in exactly the same manner in which the PC is applied the same signals, such as timing signals and address words and data words, to its own internal circuitry to control its own operation. The details of how this is done comprise no part of the present invention and are shown in many available books describing the operation of PCs. See for example (1) *The IBM PC From Inside Out* by Murray Sargent III and Richard L. Shoemaker, published 1986 by Addison-Wesley Publishing Co., and (2) *IBM Peripheral Troubleshooting & Repair* by Charles J. Brooks, published 1987 by Howard W. Sams & Company.

DESCRIPTION OF FIG. 6

FIG. 6 discloses further details of a transducer such as transducer 15-0. Each transducer group such as group 15, has 8 different transducers identical to that shown in FIG. 6. The transducer comprises range bus interface board 601, range signal board 602, transducer acoustical element 603 and conductors interconnecting the various elements with each other as well as with system bus 25. As shown on FIG. 1, bus 25 connects the 8 transducers of transducer group 15 to each other as well as to connection module board 9. Range signal board 602 and transducer acoustical element 603 are commercially available components and are not described in further detail. Acoustical element 603 comprises Polaroid environmental grade transducer available from the Polaroid Corporation of 119 Windsor Street, Cambridge, Mass. 02139. Range signal board 602 comprises a Polaroid modified range signal board which is available from the Polaroid Corporation. Further details of range bus interface board 601 are described subsequently with reference to FIG. 7.

The circuitry of FIG. 3 controls the time at which a selected transducer is fired, such as transducer 15-0 of FIG. 3 or 6, by concurrently applying over bus 25 a bank enable signal 608 to path 605 and a transducer enable signal 607 to path 604. A bank enable signal is generated by register 304 to control which of the four banks of eight transducers is to be activated. A bank enable signal 608 on path 605 specifies that now the transducer(s) that is to be activated is 1 or more of the 8 transducers in bank 15. The particular transducer(s) of bank 15 is to be activated is specified by the transducer enable signal on path 604. Path 604 of FIG. 6 is assumed to be unique to transducer 15-0 and the application of the transducer enable signal 607 to path 604 causes board 601 to extend the transducer enable signal to path 610 as signal 613. This causes board 602 to fire acoustical element 603. Element 603 emits a distance measuring pulse (617) and, after a time delay, receives back a return echo (618) indicative of the measured distance to the tunnel wall. Range signal board 602 contains the circuitry required to excite the acoustical element 603 and to detect and amplify the return echo (618).

When a transducer enable pulse 613 is applied to range signal board 602, it generates several cycles of transducer excitation and applies an excitation signal 617 over path 616 to the element 603. Range signal board 602 returns a transmit gate signal 614 over path 611 to range bus interface board 601 at the same time that signal 617 is generated and applied to path 616. The leading edge of the signal 614 represents the time at which signal 617 is first applied to path 616. Acoustical element 603 is activated by signal 617 and emits an ultrasonic pulse. Subsequently, a return echo pulse is received by element 603 and is applied as signal 618 echo back over path 616 to range signal board 602. Range signal board 602 receives the echo 618 signal and generates the receive gate signal 615 and applies it to path 612. The leading edge of signal 615 represents the time at which the signal 618 is received by acoustical element 603. The time difference between the leading edges of the transmit gate pulse 614 and the received gate pulse 615 is the range time which is equal to $t = 2r$ divided by v where r is the distance from the transducer to the tunnel wall and where v is the velocity of sound. Board 601 contains a flip flop which is set with the receipt of the transmit gate signal 614 and which is reset when the receive gate signal 615 is received. The duration of time that this flip flop is set controls the width of the range gate signal 609 on path 606. This time duration defines the distance measured by the element 603.

In summary, the logical sequence for the operation of the circuitry of FIG. 6 is as follows. First, the bank enable signal 608 on path 605 goes true. Concurrently transducer enable signals 607 and 613 go true. After a small delay, the transducer excitation signal 617 and the transmit gate signal 614 are generated by the range signal board 602. The range gate flip flop board 601 is set by the transmit gate signal 614. Next, when an echo from the tunnel wall is received by element 603, the receive gate signal 615 is generated and its leading edge causes the range gate flip flop in element 601 to be reset. The duration of the range gate pulse 609 on path 606 is controlled by the range gate flip flop and pulse 609 is transmitted to the interface board where it causes a range timer in counter group 311 or 312 in the interface board to be advanced a number of counts proportional to the clearance between the transducer of FIG. 6 and the tunnel wall.

DESCRIPTION OF FIG. 7

FIG. 7 discloses further details of the range bus interface board 601 of FIG. 6.. Conductor 604 receives the transducer enable signal 607 from bus 25 and applies it to the input of amplifier gate 701. Conductor 605 receives the bank enable signal 608 from bus 25 and applies it via amplifier 703 to the control inputs of gated amplifiers 701 and 702. Amplifier gate 701 is fully enabled with the concurrent reception of signals on paths 604 and 704 and it extends a true transducer enable signal 607 over path 710, amplifier 711, and path 610 to range signal board 602. Range signal board 602 responds to the reception of the true transducer enable signal on path 610 and activates the acoustical element 603 shown on FIG. 6. At the same time, board 602 generates a low transmit gate signal 614 and applies it over path 611 to the lower input of gate 707 set the slip flop comprising gates 705 and 707. The setting of this flip flop generates a low signal on path 714 which is extended via amplifier gate 702 to path 606 as the leading edge of a range gate signal 608.

Subsequently, an echo is received by element 603 and, in turn, by the range signal board 602. Board 602 then generates a low receive gate signal 615 and applies it to path 612 to the lower input of gate 706. Gate 706 extends the signal over path 712 to the upper input of gate 705 to reset the flip flop comprising the gates 705 and 707. This terminates the low true state of the output of gate 705 and drives path 714 high. This high is extended through gate 702 to path 606 to terminate the low true range gate signal. Range signal board 602 now terminates the low receive gate signal on path 612 and drives path 612 high.

The upper input of gate 706 is connected to path 710 to provide for resetting the flip flop on' the trailing edge of the transducer enable signal 607 in the event that the range signal board fails to detect an object and generate a receive gate signal 615 on path 612. At that time, the low on path 604 is extended through amplifier gate 701 and over lead 710 to the upper input of gate 706. This causes the output of gate 706 to reset the flip flop by a low on path 712.

Figure 9:
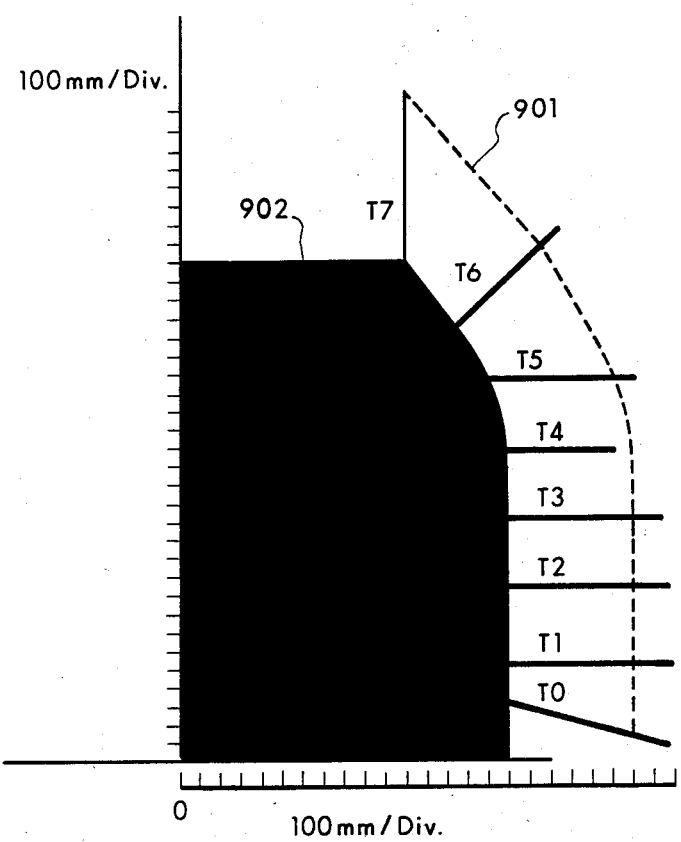
FIG. 9 indicates another manner in which the clearance information may be displayed.

DESCRIPTION OF TABLES 1 and 2 and FIGS. 8 and 9

TABLE 1

Array Origin Relative to Track Origin 0, 1384

| Transducer | X | Y | Angle | Std. Range | Min. Range | Max. Range |
|---|---|---|---|---|---|---|
| 7 | 1092 | 2692 | 90 | 900 | 900 | 1025 |
| 6 | 1346 | 2337 | 45 | 600 | 600 | 1025 |
| 5 | 1524 | 2057 | 0 | 600 | 600 | 1025 |
| 4 | 1600 | 1676 | 0 | 600 | 600 | 1025 |
| 3 | 1600 | 1295 | 0 | 600 | 600 | 1025 |
| 2 | 1600 | 914 | 0 | 600 | 600 | 1025 |
| 1 | 1600 | 508 | 0 | 600 | 600 | 1025 |
| 0 | 1600 | 304 | −18 | 635 | 635 | 1025 |

TABLE 2

| Longitudinal Position | T7 | T6 | T5 | T4 | T3 | T2 | T1 | T0 |
|---|---|---|---|---|---|---|---|---|
| 46179 | 972 | 721 | 667 | 673 | 751 | 756 | 771 | 810 |
| 46181 | 954 | 740 | 679 | 655 | 734 | 762 | 770 | 791 |
| 46183 | 954 | 741 | 686 | 659 | 738 | 760 | 769 | 805 |
| 46184 etc. | 969 | 728 | 677 | 678 | 741 | 755 | 769 | 812 |
| 46297 | 1040 | 788 | 772 | 775 | 828 | 846 | 863 | 887 |
| 46299 | 1035 | 796 | 777 | 776 | 821 | 847 | 862 | 888 |
| 46300 | 1040 | 797 | 772 | 775 | 821 | 858 | 855 | 896 |
| 46301 | 997 | 792 | 775 | 778 | 780 | 817 | 836 | 870 |

Table 1 comprises no part of the present invention. However, it does disclose the type of information that may be advantageously stored in the memory of computer C prior to the time that the range data derived by the present invention is transmitted to the computer 41. Table 1 discloses what may be termed as system set up information for one bank. This information specifies the manner in which the transducers of FIG. 9 are positioned prior to the initiation of a test run through a tunnel. The top line on Table 1 contains information indicating the position of the single bank test array relative to the track origin on FIG. 1. The position of the array is designated as 0, 1384. The origin of the test array is defined as the horizontal center of the test bed 2 on FIG. 1. The information 0, 1384 represents x,y axis information the 0 specifies that the center of the test bed 2 is not offset in a horizontal direction with respect to the center 4 of the track origin. The 1384 indicates that the y position of the center of the test bed 2 is 1384 millimeters above the center 4 of the track origin on FIG. 1.

The remaining lines of Table 1 contain information indicating the positioning of the 8 transducers of one bank designated 0 through 7. The columns in this portion of Table 1 are designated, from left to right, "Transducer, X, Y, Angle, Standard Range, Minimum Range and Maximum Range". In the column designated "Transducer" are the designations of the 8 transducers 0 through 7 with transducer 7 being in the top line of this portion of Table 1 and with the other transducers being indicated below in descending numerical order. The X and the Y columns represent the position of the associated transducer in millimeters with respect to the origin 4 of FIG. 1. Thus, transducer 7 is displaced 1092 millimeters to the right of origin 4 and 2692 millimeters above the origin of 4. The 90 in the column designated "Angle" indicates that the transducer is positioned 90 degrees with respect to horizontal. In other words, it is pointing straight up. The column designated "Standard Range" defines the range from the transducer location to the expected tunnel wall location as defined by railroad standard tunnel dimensions. The columns designated "Minimum Range and Maximum Range" define the limits for sorting the data that would be measured. Measured values which fall outside of these limits are listed as undersized or oversized respectively. Undersized is a serious anomaly since it may interfere with the passage of trains through the tunnel. Oversized is less serious but extreme oversize points may represent possible cave-in areas. The minimum is set to or slightly greater than the standard range. The maximum is set to a larger value according to the geological and/or structural conditions of the tunnel. Thus, transducer 7 is set at a standard range of 900 millimeters, a minimum range of 900 millimeters and a maximum range of 1025 millimeters.

Similar information as shown on Table 1 is recorded in the computer memory prior to a test for the remaining transducers 6, 5, 4, 3, 2, 1, 0. Transducer 6 is indicated as having an angle of 45 degrees. This means that it is pointing up to the right 45 degrees from horizontal. Transducers 5, 4, 3, 2, 1 have an angle of 0 which means that they are horizontal and pointing to the right. Transducer 0 is indicated as having an angle of minus 18 degrees. This indicates that the transducer is pointing downwards 18 degrees from horizontal.

Table 1 contains set up information for a test of the tunnel having two tracks. The transducer arrangement of Table 1 is different than that of FIG. 1 which is arranged for testing a single track tunnel. In many two track tunnels, there is a central gallery in the roof to accommodate electric lines and other utilities. Since the dimension of such galleries tend to be outside the usual range of measurement, no measurement need be made. The vertically oriented transducer 7 is positioned to measure the tunnel roof just to the side of the central gallery. Such is the case for FIG. 9 where transducer T7 is pointed up and measures the distance to the roof of a tunnel. Accordingly, the angle of transducer 7 is 90 degrees on Table 1. Transducer T6 on FIG. 9 is oriented at 45 degree angle as specified in Table 1. Transducers 5, 4, 3, 2 and 1 of FIG. 9 are horizontal and have an angle of 0 as indicated in Table 1. Transducer T0 tilts downward 18 degrees as specified in Table 1 and as shown on FIG. 9. The 8 transducers of FIG. 9 are comparable to the transducer group 15 of FIG. 1 except that transducer 15-7 points straight up while transducer 15-16 points upwards at an angle of 45 degrees. The 8 transducers of this group may utilize the circuitry of FIGS. 3 and 4 to generate the test data for the two track tunnel.

Table 2 represents the test data that is generated by the apparatus of the present invention when the test arrangement of FIG. 9 and Table 1 is activated to generate data for a test run through a two track tunnel. The left most column of Table 2 designates the longitudinal position of the test array within the tunnel. This information is generated by odometer 7 of FIGS. 1 and 3 and represents meters and tenths of meters. The odometer is set to a predetermined position at the beginning of the test run and it generates longitudinal positional information every 100 millimeters as the test array travels through the tunnel. Table 2 shows that the initial test site is at position 46179 within the tunnel. This represents 4617.9 meters. The 8 transducers are activated at this site and the clearance information between each transducer in the tunnel wall is generated and recorded in the computer. This information is shown on the top data line on Table 2. Next, the test array continues to move and another measurement is made at the next test site which has a specified longitudinal test position within the tunnel of 46181 (4618.1 meters). This position is 0.2 meters further into the tunnel than the first test position. The transducers T7 through T0 then are activated and collect clearance information for this test site. In a similar manner, measurements are made at other test sites within the tunnel with the next test site having a longitudinal position of 46183 and with the last test site having a longitudinal position of 46301. The specified data represents the clearance information between each transducer and the tunnel wall at each test site and as already mentioned, this information is generated by the circuitry of FIGS. 3 and 4 following which it is transferred to the computer C and storage in its memory.

FIG. 8 represents one possible manner in which the data of Table 2 as generated by the apparatus of the present invention may be displayed by apparatus comprising no part of the invention under control of the computer after the computer receives the test data generated by the apparatus of the present invention. The transducers 0 through 7 are shown on the left and are associated with lines 800 through 807 which represent the standard range for each transducer. The dotted line associated with each of line 800 through 807 represents the actual clearance measured by each transducer during the test. Thus for transducer 0, the clearance measured by it is somewhat greater than the standard range 800. The exception is at point 811 where a protrusion is detected. At that point the clearance information is less than the standard range. Transducer 7 measures clearance information somewhat greater than the standard range and at point 812 transducer 7 measures a recess in the tunnel wall which allows train personnel to take refuge in the event that they are in the tunnel while the train passes. The horizontal line at the bottom of FIG. 8 represents the longitudinal tunnel position which corresponds to the longitudinal position information of Table 2.

FIG. 9 portrays the profile information for a tunnel that may be generated by the computer utilizing the data recorded of Tables 1 and 2. The profile as well as the software by which the computer generates this profile information comprises no part of the invention. In FIG. 9, the solid lines designated T0 through T7 represent both the angular direction in which the associated transducer is positioned and the clearance detected by each transducer at the site represented by the profile of FIG. 8. Dashed line 901 represents the standard or minimum range from the Tables 1 and 2. The length of the T-line represents the measured clearance information. Thus, lines T0, 1, 2, 3, 5 and 6 indicate that the clearance distance is greater than the standard range. Line T4 indicates a wall protrusion since the length of line T4 is less than the standard range. Line T7 is essentially equal to the standard range.

DESCRIPTION OF FIGS. 10 AND 11

The transducer used in accordance with the present invention is shown on FIGS. 10 and 11 with FIG. 10 representing an end view looking into the open end of the transducer and with FIG. 11 representing a cross section taken along lines 11—11 of FIG. 10. The transducer comprises a disk shape acoustical device 603 mounted within the body of the transducer electronics case 1003. The acoustical element 603 views the target through the transducer barrel 1002 which is cylindrical and which is lined with sound absorbing material 1001. The dimensioning of the barrel 1002 and the lining 1001 constrict the angle view of the transducer element 603 to approximately 24 degrees. This roughly corresponds to a natural beam pattern which is 30 db down at 30 degrees. The sound absorbing material 1001 is of the type that does not return a detectable echo at a range of 25 centimeters.

Transducers which are pointed upward at an angle above horizontal require protection from falling water within the tunnel. This protection is provided by a water deflector assembly subsequently described on FIG. 12 which uses an air jet to deflect falling water away from the open end of the transducer barrel 1002. The end of the barrel 1002 as a bevel for this purpose. Element 602 is the range signal board which contains the circuitry required to excite the acoustical element 603 and to amplify and detect the return echo. It is mounted within case 1003. The range bus interface board 601 is also mounted within case 1003 and is connected to the circuitry of FIGS. 3 and 4 by means of the connector 1104. FIG. 10 is an end view of the transducer of FIG. 11. The beveled end 1005 of barrel 1002 provides the air jet bevel that cooperates with blower arrangement of FIG. 12 to prevent falling water from entering the hollow portion 1002 of a transducer when it is inclined upwards from horizontal.

DESCRIPTION OF FIG. 12

Figure 12:
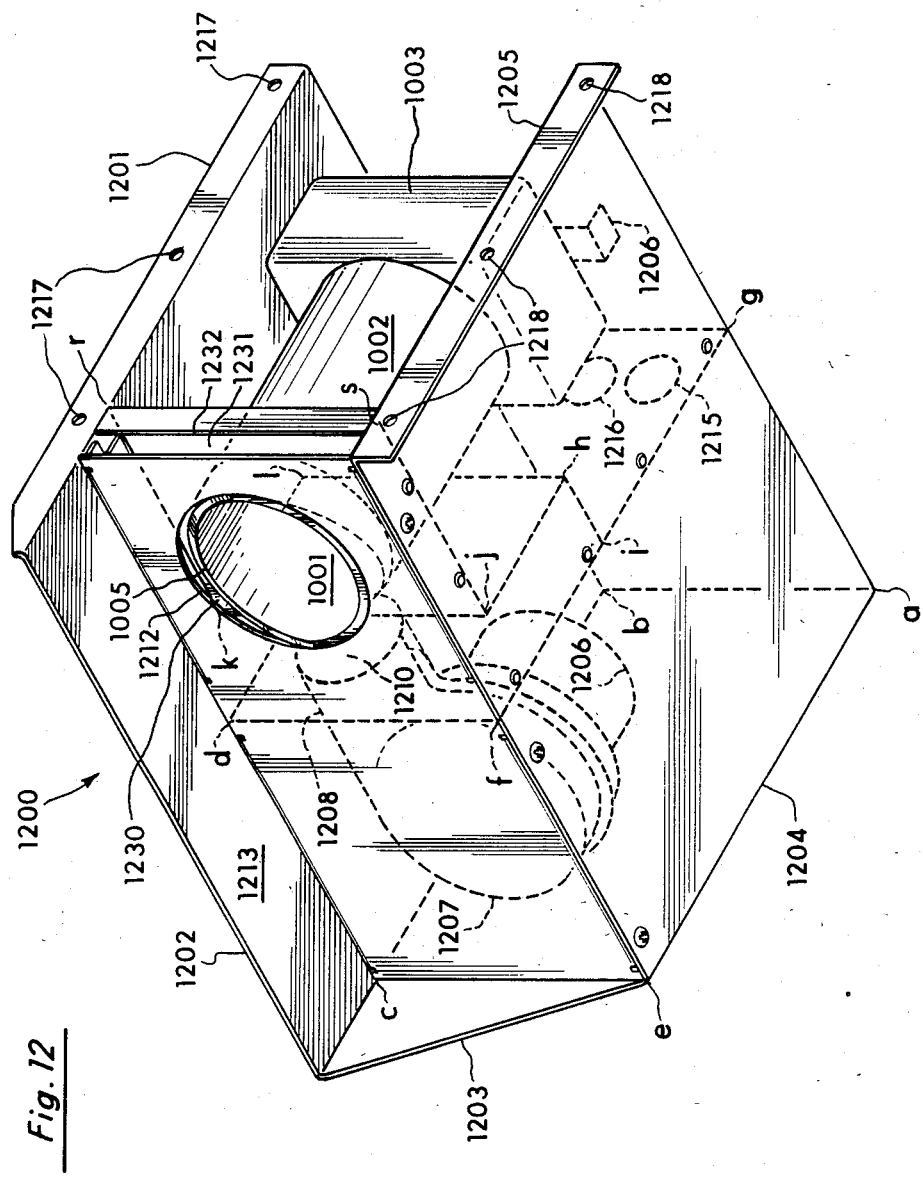
FIG. 12 discloses the details of a transducer mounting apparatus.

FIG. 12 discloses the apparatus 1200 that houses the transducer assembly of FIGS. 10 and 11. The apparatus 1200 shown on FIG. 8 is used when the transducer is mounted on the left side of a template and when the transducer tilts upward from horizontal, such as at an angle of 45 degrees as the case for transducer 13-4 of FIG. 1. The description of FIG. 12 will be in accordance with the assumption that a specific transducer shown on FIG. 12 is transducer 13-4 and that it tilts upward at 45 degrees.

The entire transducer including the barrel 1002 and the case 1003 are mounted in the assembly apparatus 1200 of FIG. 12. Apparatus 1200 comprises a frame having a right hand upper flange 1201, a top panel 1202, a left panel 1203, a front panel 1211, a bottom panel 1204 and a lower right hand flange 1205. The holes 1217 and 1218 in flanges 1201 and 1205 are used with suitable screws to attach the apparatus 122 to a mounting mixture (not shown). The transducer case 1003 and barrel 1002 are mounted within apparatus 1200 in such a manner that the open end of the barrel 1002 cooperates with a hole 1212 in the front panel 1211 so that the acoustical signals transmitted and received by the transducer pass through hole 1212. The beveled front 1005 of barrel 1002 is shown on FIG. 12.

The side panel 1203 is inclined on its front edge because the forward edge of the top panel 1202 projects outward on FIG. 8 beyond the front edge of bottom panel 1204. This protruding part is designated as 1213 and serves to partially protect the open end of the transducer from receiving moisture that may drop from the walls of the tunnel. Further protection against falling moisture is provided by the motor fan assembly comprising a motor 1206, a fan assembly 1207 and exhaust tube 1208 having a circular end 1210. The fan 1207 generates sufficient volume of air which is exhausted out to the bottom of FIG. 12 past the beveled end 1005 of the transducer so that the downward movement of air deflects any moisture that might otherwise fall within the open end of the transducer cylindrical portion 1002.

The fan assembly 1207 is housed within a chamber of apparatus 1200. The chamber has a bottom portion defined by the four corners a, e, f, and g. The left wall of this chamber is defined by its four corners as a, b, c, and e. The right wall of this chamber is defined by its four corners g, f, and d with the upper right hand corner of the chamber not being shown on FIG. 12. The front wall of the chamber is defined by its four corners d, c, e, and f. The rear wall of the chamber is defined by its four corners as g, a, and b with the fourth corner not being specifically shown on FIG. 12. The right side of this chamber also includes another chamber shown to the right in FIG. 12 and with its bottom portion being defined by the corners f, i, h, and j and with its top portion being partially defined by the corners d, k, and 1 with the fourth corner not being discernable on FIG. 12. This second and smaller chamber receives the output 1210 of the blower 1207 by means of a hole in the smaller chamber.

The air that is propelled by opening 1210 of the blower 1207 is exhausted downward on FIG. 12 through the moon shaped opening 1230 shown on FIG. 12 and past the beveled portion 1005 of the transducer tube 1002. This moon shaped opening 1230 on FIG. 12 is defined by the upper 180 degrees of hole 1212 and the beveled end 1005 of transducer barrel 1002. The air that is propelled through this moon shaped opening is projected downward at an inclined angle by the beveled portion 1005 of the transducer barrel 1002. This high volume of air moving at this inclined angle deflects away any drops of moisture that otherwise might pass by overhang 1213 of the top panel 1202 and otherwise enter the transducer barrel 1002.

Holes 1215 and 1216 are air intake holes for the motor fan assembly 1206 and 1207. These holes allow air to enter the chamber in which the motor fan assembly is housed. Bracket 1206 provides a means of mounting the transducer case 1003 to the bottom panel 1204 of the transducer mounting assembly.

The transducer mounting assembly of FIG. 12 is specifically designed for a transducer mounted on the left side of a template of the type shown on FIG. 1 and wherein the transducer is inclined upwards from horizontal. In this case, the protruding overhang portion 1213 of the top panel 1202 partially protects the open end of the transducer barrel 1002 from receiving water that may drip from the tunnel. This partial protection provided by projection 1213 is supplemented by the volume of air blown by the inclined end of the transducer barrel 1002 by the motor fan assembly. In a similar manner, a transducer inclined upwards from horizontal and mounted on the right side of the template of FIG. 1 would be configured so that the bottom panel 1204 had a projecting portion similar to portion 1213 that projects out beyond the front panel 1211 of apparatus 1200. The upper panel 1202 would then not have a projecting portion 1213. For a transducer that points straight up, such as for example transducer 14-7 of FIG. 1, it does not matter whether panel 1202 or 1204 has a projecting portion since any such projecting portion would play no part in protecting the open end of the transducer barrel from falling water. It is necessary for a transducer that projects straight upward to rely solely upon the high volume of air provided by the motor fan assembly to protect the open end of the transducer from falling moisture.

While a specific embodiment of the invention has been disclosed, it is expected that those skilled in the art can and will implement variations of the preferred embodiment disclosed therein, which variations still fall within the scope of the appended claims.

I claim:

1. A method of measuring the inner dimensions of an inner wall of a tunnel at a plurality of tunnel sites, said method comprising the steps of:
   mounting a plurality of transducers on an inspection vehicle so that there is a clearance between each of said transducers and said inner wall with each of said transducers being associated with a different portion of said wall at each of said sites,
   moving said vehicle through said tunnel, and
   operating said transducers at said plurality of tunnel sites as said vehicle moves through said tunnel to generate data specifying the magnitude of said clearance at each of said sites between each operated transducer and said portion of said tunnel wall associated with each said operated transducer.

2. A method of measuring inner dimensions of an inner wall of a tunnel at a plurality of tunnel sites, said method comprising the steps of:
   mounting a plurality of transducers on an inspection vehicle so that there is a clearance between each of said transducers and said inner wall,
   arranging said plurality of transducers on said vehicle to form an imaginary template having a perimeter parallel to said inner wall,
   moving said vehicle through said tunnel,
   operating said transducers at said plurality of tunnel sites as said vehicle moves through said tunnel to generate output signals representing the magnitude of said clearance at each of said sites between each operated transducer and a portion of said tunnel wall associated with said each operated transducer, and
   using said signals to generate data specifying said magnitude of said clearance at each of said sites between each said operated transducer and a portion of said tunnel wall associated with said each operated transducer.

3. The method of claim 2 wherein said step of operating includes operating all of said transducers at each of said sites.

4. A method of measuring the inner dimensions of an inner wall of a tunnel wall at a plurality of tunnel sites, said method comprising the steps of:
   mounting a plurality of transducers on an inspection vehicle adapted to move along a predefined path through said tunnel so that there is a clearance between each of said transducers and said inner wall,
   arranging said plurality of transducers on said vehicle to form an imaginary template by positioning each of said transducers a predetermined distance from a nominal position of said inner wall of said tunnel,
   moving said vehicle along said path through said tunnel,
   operating said transducers at a plurality of tunnel sites as said vehicle moves to generate output signals representing the magnitude of said clearance at each of said sites between each operated transducer and said tunnel wall,
   using said output signals to generate data specifying said magnitude of said clearance at each of said sites between each of said operated transducers and a portion of said tunnel wall associated with said each operated transducer, and
   applying said data to an output circuit path for subsequent utilization by a data recording means.

5. The method of claim 4 wherein said steps of operating said transducers and generating said data comprises the steps of;
   operating selected ones of said transducers for generating an output signal for each said selected transducer having a signal width determined by said magnitude of said clearance between said selected transducer and said portion of said tunnel wall associated with said selected transducer, and
   responding to said generation of said output signal for generating said data specifying said magnitude of said clearance between said tunnel wall and said selected transducer.

6. The method of claim 4 wherein said steps of operating said transducers and generating said data comprises the steps of;
   operating said transducers for generating an output signal for each operated transducer having a signal width determined by said magnitude of said clearance between said each operated transducer and a portion of said tunnel wall associated with said each transducer,
   generating a series of pulses, and
   responding to a concurrent generation of said pulses and said output signal for each of said operated transducers for operating counters associated with said operated transducers to generate data specifying said magnitude of said clearance for each of said operated transducers.

7. The method of claim 4 wherein said transducers are arranged to comprise a plurality of transducer groups, and wherein said steps of operating said transducers and generating said data comprise the steps of;
   applying a group enable signal to all transducers of a selected one of said groups,
   concurrently applying a transducer enable signal to a selected transducer of said selected group,
   operating said selected transducer in response to a concurrent application of said group enable signal and said transducer enable signal to said selected transducer to emit a transducer output signal towards said portion of said tunnel wall associated with said selected transducer,
   further operating said selected transducer in response to said concurrent application to generate a first pulse whose leading edge is coincident with the time at which said transducer output signal is first emitted,
   operating said selected transducer in response to a receipt of a return echo of said emitted output signal from said tunnel wall to generate a second pulse whose leading edge represents the time at which said echo is first received by said selected transducer,
   responding to said generation of said first and second pulses by said selected transducer for generating a range gate signal whose width is proportional to said magnitude of said clearance between said portion of said tunnel wall associated with said selected transducer and said selected transducer, and generating said data specifying said magnitude of said clearance under control of said range gate signal.

8. The method of claim 7 in combination with the step of operating each remaining one of said transducers by a generation of group enable signal for said each remaining transducer and a concurrently generated transducer enable signal unique to said remaining each transducer to derive data at each site representing said magnitude of said clearance between said tunnel wall and said each remaining transducer.

9. The method of claim 4 wherein said transducers are arranged to comprise a plurality of transducer groups, and wherein said steps of operating said transducers and generating said data comprises the steps of;
  applying a group enable signal to all transducers of a selected one of said groups,
  applying a transducer enable signal to a selected transducer of said selected group,
  operating said selected transducer in response to a concurrent application of said group enable signal and said transducer enable signal to cause said selected transducer to emit a ultrasonic signal towards said portion of said tunnel wall associated with said selected transducer,
  further operating said selected transducer in response to said concurrent application to generate a first pulse whose leading edge is coincident with the time at which said ultrasonic signal is first emitted,
  operating said selected transducer in response to a receipt of a return echo of said emitted ultrasonic signal from said tunnel wall to generate a second pulse whose leading edge represents the time at which said echo is first received by said selected transducer,
  responding to said generation of said first and second pulses by said selected transducer for generating a range gate signal whose width is proportional to said magnitude of said clearance between said portion of said tunnel wall associated with said selected transducer and said selected transducer,
  applying counting pulses to all counters of a group of counters having a counter associated with each transducer of said group that receives said selected group enable signal,
  applying said range gate pulse signal from said selected transducer to the one of said counters associated with said selected transducer, and
  operating said one counter in response to a concurrent reception by said one counter of said counting pulses and said range gate pulse signal to advance said one counter one counting position for each counting pulse received while said range gate signal remains applied,
  the counting position of said one counter at the termination of said range gate signal representing said magnitude of said clearance between said portion of said tunnel wall associated with said selected transducer and said selected transducer.

10. The method of claim 9 in combination with the step of operating each remaining one of said transducers by a concurrent application of a group enable signal to the group containing said one remaining transducer and said transducer enable signal unique to said remaining one transducer to derive data at each site representing said magnitude of said clearance between said portion of said tunnel wall associated with said remaining one transducer and said remaining one transducer.

11. The method of claim 4 wherein said transducers are arranged to comprise a plurality of transducer groups, and wherein said step of operating said transducers and generating said data comprises;
  applying a group enable signal to all transducers of a selected one of said groups,
  applying transducer enable signals to a plurality of selected transducers of said selected group,
  operating said selected transducers in response to a concurrent application of said group enable signal and said transducer enable signals to emit ultrasonic signals from each operated transducer towards said tunnel wall,
  further operating each of said selected transducers in response to said concurrent application to generate a first pulse signal whose leading edge is coincident with the time at which said ultrasonic signal is first emitted by said each selected transducer,
  operating each of said selected transducers in response to a receipt of a return echo of said emitted ultrasonic signal from said tunnel wall to said each selected transducer to generate a second pulse signal whose leading edge represents the time at which said echo is first received by said each selected transducer,
  responding to said generation of said first and second pulse signals by said each selected transducer for generating range gate pulse signal for said each selected transducer whose pulse width is proportional to said magnitude of said clearance between said portion of said tunnel wall associated with said each selected transducer and said each selected transducer, and
  generating said data under control of said width of each of said range gate signals.

12. The method of claim 4 wherein said transducers are arranged to comprise a plurality of transducer groups, and wherein said step of operating said transducers and generating said data comprises;
  applying a group enable signal to all transducers of a selected one of said groups,
  applying transducer enable signals to a plurality of selected transducers of said selected group,
  operating said selected transducers in response to a concurrent application of said group enable signal and said transducer enable signals to emit a ultrasonic signal from each operated transducer towards said tunnel wall,
  further operating each of said selected transducers of said selected group in response to said concurrent application to generate a first pulse whose leading edge is coincident with the time at which said ultrasonic signal is first emitted by each said operated transducer,
  operating each of said selected transducers of said selected group in response to a receipt of a return echo of said ultrasonic signal from said tunnel wall to each operated transducer to generate a second pulse whose leading edge represents the time at which said echo is first received by each said operated transducer,
  responding to a generation of said first and second pulses by each of said operated transducers for generating a range gate signal for each of said operated transducers whose signal width is proportional to said magnitude of said clearance between said portion of tunnel wall associated with said each operated transducer and said each operated transducer, a group of counters having a counter associated with each transducer of said selected group that receives said group enable signal, applying counting pulses to all of said counter of said group of counters, applying said range gate signals to the ones of said counters associated with each of said operated transducers, said last named counters being responsive to each concurrent reception of said counting pulses and said range gate signals to advance one counting position for each counting pulse received while said range gate signals are applied, the counting position of each of said counters at the termination of said range gate signal received by each of said counters representing said magnitude of said clearance between said portion of said tunnel wall associated with said each operated transducer and said each operated transducer.

13. The method of claim 4 in combination with the steps of:

providing a range transducer and a fixed target spaced apart a predetermined distance from said range transducer on said inspection vehicle, and operating said range transducer to provide a reference range output signal for calibrating said output signals of others of said transducers.

14. The method of claim 4 in combination with the steps of:

providing an odometer on said inspection vehicle, operating said odometer as said inspection vehicle moves through said tunnel to generate information specifying the position of said vehicle within said tunnel, and operating said transducers periodically under control of said position information so that said tunnel sites are spaced apart a predetermined distance from each other.

15. The method of claim 4 in combination with the steps of:

providing an odometer on said inspection vehicle, operating said odometer as said inspection vehicle moves through said tunnel to generate information specifying the position of said vehicle within said tunnel, and transmitting said position information together with said distance data to other apparatus so that the position of said inspection vehicle within said tunnel for each test site may be determined by said other apparatus.

16. The method of claim 4 in combination with the steps of:

mounting some of said transducers at an angle inclined upwards above horizontal and blowing a high volume of air across an opening of said inclined transducers to prevent any moisture from said tunnel from falling into said opening.

17. Apparatus for measuring inner dimensions of an inner wall of a tunnel at a plurality of tunnel sites, said apparatus comprising;

an inspection vehicle adapted to move through said tunnel, a plurality of transducers mounted on said vehicle with there being a clearance between each of said transducers and said tunnel wall with each of said transducers being associated with a different portion of said tunnel wall at each of said sites, means on said vehicle for operating said transducers at a plurality of tunnel sites as said vehicle travels through said tunnel to generate output signals representing the magnitude of said clearance between each of said operated transducers and said portion of said tunnel wall associated with said each operated transducer at each of said sites within said tunnel, and means on said vehicle responsive to said generation of said output signals for generating data specifying said magnitude of said clearance at each of said sites between each of said operated transducers and said portion of said tunnel wall associated with said each operated transducer.

18. The apparatus of claim 17 wherein said means for operating includes means for operating all of said transducers in a predetermined sequence at each of said sites.

19. Apparatus for measuring inner dimensions of an inner wall of a tunnel at a plurality of sites, said apparatus comprising;

an inspection vehicle adapted to move along a predetermined path through said tunnel, a plurality of transducers mounted on said vehicle and arranged to form an imaginary template with each transducer being positioned a predetermined distance from the nominal position of said inner wall of said tunnel, means on said vehicle for periodically operating selected ones of said transducers as said vehicle travels from site to site along said path through said tunnel to generate output signals representing the magnitude of said distance between each of said selected transducers and said tunnel wall at each of said sites, and means on said vehicle responsive to said generation of said output signals for generating data specifying said magnitude of said distance at each of said sites between each of said selected transducers and said portion of said tunnel wall associated with said each selected transducer.

20. The apparatus of claim 19 wherein said means for generating said data comprises;

means responsive to said operation of each selected one of said transducers for generating an output signal having a width determined by said distance between said selected transducer and said portion of said tunnel wall associated with said selected transducer, and means responsive to said generation of said output signal for generating said data specifying said magnitude of said distance between said selected transducer and said portion of said tunnel wall associated with said selected transducer.

21. The apparatus of claim 19 wherein said means for generating said data comprises;

means responsive to said operation of each selected one of said transducers for generating an output signal for each selected transducer having a width determined by said magnitude of said distance between said each selected transducer and said portion of said tunnel wall associated with said selected transducer, a plurality of counters each of which is associated with a different one of said transducers, means for generating a series of pulses, and means responsive to a concurrent generation of said pulses and each said output signal for operating said counters to generate data specifying said magnitude of said distance between each selected transducer and said portion of said tunnel wall associated with said selected transducer.

22. The apparatus of claim 19 wherein said transducers are arranged to comprise a plurality of transducer groups, and wherein said means for operating said transducers comprises;

means for applying a group enable signal to all transducers of a selected one of said groups, means for applying a transducer enable signal to a selected transducer of said selected group, means in said selected transducer responsive to each concurrent application of said group enable signal and said transducer enable signal to emit an ultrasonic signal towards said tunnel wall, means in said selected transducer responsive to said concurrent application to generate a first pulse whose leading edge is coincident with the time at which said ultrasonic signal is first emitted, means in said selected transducer responsive to a reception of a return echo of said ultrasonic signal from said tunnel wall to generate a second pulse whose leading edge represents the time at which said echo is first received by said selected transducer, means responsive to said generation of said first and second pulses by said selected transducer for generating a range gate pulse signal whose width is proportional to said magnitude of said distance between said portion of said tunnel wall associated with said selected transducer and said selected transducer, and means for generating said data under control of said range gate signal.

23. The apparatus of claim 22 in combination with means for operating each remaining one of said transducers by a concurrent generation of group enable signals and transducer enable signals associated with said remaining transducers to derive data at each site representing said magnitude of said distance between said portion of said tunnel wall associated with each of said remaining transducers and each of said remaining transducers.

24. The apparatus of claim 19 wherein said transducers comprise a plurality of transducer groups, and wherein said means for operating said transducers comprises;

means for applying a group enable signal to all transducers of a selected one of said groups, means for applying a transducer enable signal to a selected transducer of said selected group, means in said selected transducer responsive to a concurrent application of said group enable signal and said transducer enable signal to emit a ultrasonic signal towards said tunnel wall, means in said selected transducer responsive to said concurrent application to generate a first pulse whose leading edge is coincident with the time at which said ultrasonic signal is first emitted, means in said selected transducer responsive to a receipt of a return echo of said ultrasonic signal from said tunnel wall to generate a second pulse whose leading edge represents the time at which said echo is first received by said selected transducer, means responsive to said generation of said first and second pulses by said selected transducer for generating a range gate signal whose width is proportional to said magnitude of said distance between said tunnel wall and said selected transducer, a group of counters having a counter associated with each transducer of said selected group that receives said group enable signal, means for applying counting pulses to all of said counters, means for applying said range gate signal from said selected transducer to the one of said counters associated with said selected transducer, said one counter being responsive to a concurrent reception of said counting pulses and said range gate signal to advance one counting position for each pulse received while said range gate signal remains applied, and the position of said one counter at the termination of said range gate signal representing said magnitude of said distance between said portion of said tunnel wall associated with said selected transducer and said selected transducer.

25. The apparatus of claim 24 in combination with means for operating each other one of said transducers in response to a concurrent application of a group enable signal and a transducer enable signal to derive data at each site representing said distance between said portion of said tunnel wall associated with said each other one of said transducers and said each other one of said transducers.

26. The apparatus of claim 19 wherein said transducers comprise a plurality of transducer groups, and wherein said means for operating said transducers and generating said data comprises;

means for applying a group enable signal to all transducers of a selected one of said groups, means for applying transducer enable signals to selected ones of said transducers of said selected group, means in said selected transducers responsive to a concurrent application of said group enable signal and said transducer enable signals to emit a ultrasonic signal from said selected transducers towards said tunnel wall, means in each of said selected transducers responsive to said concurrent application to generate a first pulse whose leading edge is coincident with the time at which said ultrasonic signal is first emitted by said each selected transducer, means in each of said selected transducers responsive to a receipt of a return echo of said ultrasonic signal from said tunnel wall to generate a second pulse whose leading edge represents the time at which said echo is first received by said each selected transducer, means responsive to the generation of said first and second pulses by each of said selected transducers for generating a range gate signal for each of said selected transducers whose width is proportional to said magnitude of said distance between said tunnel wall and each of said selected transducers, and means for generating said data under control of said width of each of said range gate signals.

27. The apparatus of claim 19 wherein said transducers are arranged to comprise a plurality of transducer groups, and wherein said means for operating said transducers and generating said data comprises;
  means for applying a group enable signal to all transducers of a selected one of said groups,
  means for applying transducer enable signals to selected transducers of said selected group,
  means in said selected transducers responsive to a concurrent application of said group enable signal and said transducer enable signals to emit ultrasonic signals towards said tunnel wall,
  means in each of said selected transducers responsive to said concurrent application to generate a first pulse whose leading edge is coincident with the time at which said ultrasonic signal is first emitted by said each selected transducer,
  means in each of said selected transducers responsive to a receipt of a return echo of said ultrasonic signal from said tunnel wall to generate a second pulse whose leading edge represents the time at which said echo is first received by said each selected transducer,
  means responsive to said generation of said first and second pulses by each of said selected transducers for generating a range gate signal by each of said selected transducers whose width is proportional to said distance between said portion of said tunnel wall associated with each of said selected transducers and each of said selected transducers,
  a group of counters having a counter associated with each transducer of a group that receives a group enable signal,
  means for applying counting pulses to all of said counters,
  means for applying said range gate signals to each of said counters associated with one of said selected transducers,
  each of said counters being responsive to a concurrent reception of counting pulses and said range gate signals to advance one counting position for each pulse received while said range gate signals remains applied to said each counter,
  the counting position of each of said counters at the termination of said range gate signal received by said counters representing said magnitude of said distance between said portion of said tunnel wall associated with said each of said transducers and each of said transducers, and
  means for transferring said magnitude defined by said counters to a utilization means.

28. The apparatus of claim 19 in combination with,
  a range transducer and a fixed target spaced apart a predetermined distance from said range transducer on said inspection vehicle, and
  means for operating said range transducer to provide a reference range output signal for calibrating said output signals of others of said transducers.

29. The apparatus of claim 19 in combination with:
  an odometer on said inspection vehicle,
  means for operating said odometer as said inspection vehicle moves through said tunnel to generate information specifying the position of said vehicle within said tunnel, and
  means for operating said transducers periodically under control of said position information so that said tunnel sites are spaced apart a predetermined distance from each other.

30. The apparatus of claim 19 in combination with,
  an odometer on said inspection vehicle,
  means for operating said odometer as said inspection vehicle moves through said tunnel to generate information specifying the position of said vehicle within said tunnel, and
  means for transmitting to other means said position information together with said distance data so that the position of said inspection vehicle within said tunnel for each test site may be determined by said other means.

31. The apparatus of claim 19 in combination with;
  means for mounting some of said transducers inclined upwards at an angle above horizontal so that each inclined transducer has an opening through which a measurement signal is emitted towards said tunnel wall when said transducer is operated,
  each of said transducers having a hollow cylindrical portion,
  an opening in one end of said cylindrical portion with said end of said opening defining a plane not perpendicular to a longitudinal axis of said cylinder,
  means for mounting said cylindrical portion of said inclined transducers in a protected housing, and
  means for blowing a volume of air across said opening to prevent moisture from said tunnel wall from falling into said transducer through said opening.

32. Apparatus controlled by pulse signals received from an external source for measuring inner dimensions of an inner wall of a tunnel at a plurality of tunnel sites, said apparatus comprising;
  an inspection vehicle adapted to move through said tunnel,
  a plurality of transducers mounted on said vehicle with there being a clearance between each of said transducers and said tunnel wall with each of said transducers being associated with a different portion of said tunnel wall at each of said sites,
  means on said vehicle for receiving said pulse signals from said external source positioned elsewhere on said vehicle,
  means on said vehicle responsive to a receipt of said pulse signals from said source for operating said transducers at a plurality of tunnel sites as said vehicle travels through said tunnel to generate output signals representing the magnitude of said clearance between each of said operated transducers and said portion of said tunnel wall associated with said each operated transducer at each of said sites within said tunnel, and
  means on said vehicle responsive to said generation of said output signals for generating data specifying said magnitude of said clearance at each of said sites between each of said operated transducers and said portion of said tunnel wall associated with said each operated transducer.

33. The apparatus of claim 32 wherein said means for operating includes means for operating all of said transducers in a sequence determined by said received signals at each of said sites.

34. Apparatus for measuring inner dimensions of an inner wall of a tunnel at a plurality of sites, said apparatus comprising;
  an inspection vehicle adapted to move along a predetermined path through said tunnel,
  a plurality of transducers mounted on said vehicle and arranged to form an imaginary template with each transducer being positioned a predetermined distance from the nominal position of said inner wall of said tunnel, apparatus on said vehicle for receiving pulse signals from an external source located elsewhere on said vehicle, said pulse signals comprising clock signals and addressing and control signals, means on said vehicle responsive to said receipt of said pulse signals including said clock signals and said addressing and said control signals for periodically operating selected ones of said transducers as said vehicle travels from site to site along said path through said tunnel to generate output signals representing the magnitude of said distance between each of said selected transducers and said tunnel wall at each of said sites, and means on said vehicle responsive to said generation of said output signals for generating data specifying said magnitude of said distance at each of said sites between each of said selected transducers and said portion of said tunnel wall associated with said each selected transducer.

35. The apparatus of claim 34 wherein said means for generating said data comprises;

means responsive to said operation of each selected one of said transducers for generating an output signal having a width determined by said distance between said selected transducer and said portion of said tunnel wall associated with said selected transducer, and means controlled by said received clock signals and responsive to said generation of said output signal for generating said data specifying said magnitude of said distance between said selected transducer and said portion of said tunnel wall associated with said selected transducer.

36. The apparatus of claim 34 wherein said transducers are arranged to comprise a plurality of transducer groups, and wherein said means for operating said transducers comprises;

means responsive to said receipt of said addressing and control signals for applying a group enable signal to all transducers of a selected one of said groups, means responsive to said receipt of said addressing and control signals for applying a transducer enable signal to a selected transducer of said selected group, means in said selected transducer responsive to each concurrent application of said group enable signal and said transducer enable signal to emit an ultrasonic signal towards said tunnel wall, means in said selected transducer responsive to said concurrent application to generate a first pulse whose leading edge is coincident with the time at which said ultrasonic signal is first emitted, means in said selected transducer responsive to a reception of a return echo of said ultrasonic signal from said tunnel wall to generate a second pulse whose leading edge represents the time at which said echo is first received by said selected transducer, means responsive to said generation of said first and second pulses by said selected transducer for generating a range gate pulse signal whose width is proportional to said magnitude of said distance between said portion of said tunnel wall associated with said selected transducer and said selected transducer, and means responsive to a receipt of said clock signals for generating said data under control of said range gate signal.

37. The apparatus of claim 22 in combination with means controlled by said receipt of said pulse signals for operating each remaining one of said transducers by a concurrent generation of group enable signals and transducer enable signals associated with said remaining transducers to derive data at each site representing said magnitude of said distance between said portion of said tunnel wall associated with each of said remaining transducers and each of said remaining transducers.

38. A method of operating apparatus to measure inner dimensions of an inner wall of a tunnel at a plurality of tunnel sites, said apparatus being controlled by pulse signals generated by an external source, said method comprising the steps of:

mounting a plurality of transducers on an inspection vehicle so that there is a clearance between each of said transducers and said inner wall with each of said transducers being associated with a different portion of said wall at each of said sites, moving said vehicle through said tunnel, applying said pulse signals from said source to said apparatus, and operating said transducers in response to said application of said pulse signals at said plurality of tunnel sites as said vehicle moves through said tunnel to generate data specifying the magnitude of said clearance at each of said sites between each operated transducer and said portion of said tunnel wall associated with each said operated transducer.

* * * * *

UNITED STATES PATENT AND TRADEMARK OFFICE
CERTIFICATE OF CORRECTION

PATENT NO. : 4,888,720

DATED : December 19, 1989

INVENTOR(S) : Glenn E. Fryer

It is certified that error appears in the above-identified patent and that said Letters Patent is hereby corrected as shown below:

In Column 17, line 9, "the" should be deleted. In Column 20, line 28, --a-- should be inserted after "generating". In Column 21, line 6, "counter" should be --counters--. In Column 28, line 21, the claim number "22" should be --36--.

Signed and Sealed this

Eighteenth Day of February, 1992

Attest:

HARRY F. MANBECK, JR.

*Attesting Officer*  *Commissioner of Patents and Trademarks*